US012119859B2

(12) United States Patent
Kang et al.

(10) Patent No.: US 12,119,859 B2
(45) Date of Patent: Oct. 15, 2024

(54) COVER WINDOW, MANUFACTURING METHOD OF COVER WINDOW, AND DISPLAY DEVICE INCLUDING COVER WINDOW

(71) Applicant: SAMSUNG DISPLAY CO., LTD., Yongin-si (KR)

(72) Inventors: Byung Hoon Kang, Seoul (KR); Byeong-Beom Kim, Anyang-si (KR); Seung Ho Kim, Anyang-si (KR); Cheol Min Park, Hwaseong-si (KR); Chang Moo Lee, Suwon-si (KR); Hoi Kwan Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 487 days.

(21) Appl. No.: 17/481,021

(22) Filed: Sep. 21, 2021

(65) Prior Publication Data

US 2022/0321159 A1    Oct. 6, 2022

(30) Foreign Application Priority Data

Apr. 6, 2021   (KR) .................... 10-2021-0044832

(51) Int. Cl.
*H04B 1/3888* (2015.01)
*B32B 17/10* (2006.01)
*G06F 1/16* (2006.01)
*C03C 23/00* (2006.01)

(52) U.S. Cl.
CPC ..... *H04B 1/3888* (2013.01); *B32B 17/10174* (2013.01); *G06F 1/1652* (2013.01); *C03C 23/009* (2013.01)

(58) Field of Classification Search
CPC .................................................. C03C 23/009
See application file for complete search history.

(56) References Cited

U.S. PATENT DOCUMENTS

| | | | |
|---|---|---|---|
| 10,472,271 B2 | 11/2019 | Dutta et al. | |
| 2014/0120311 A1* | 5/2014 | Smith | C03C 19/00 428/141 |
| 2016/0326050 A1* | 11/2016 | Lee | C03C 21/002 |
| 2020/0398530 A1 | 12/2020 | Kuo et al. | |

FOREIGN PATENT DOCUMENTS

| | | |
|---|---|---|
| CN | 111882993 A | 11/2020 |
| EP | 1433758 B1 | 12/2010 |
| WO | WO 2006-030574 A1 | 3/2006 |
| WO | WO 2020-112639 A1 | 6/2020 |

* cited by examiner

*Primary Examiner* — David Sample
(74) *Attorney, Agent, or Firm* — Lewis Roca Rothgerber Christie LLP

(57) ABSTRACT

A cover window, a manufacturing method of a cover window, and a display device including a cover window are provided. A cover window includes a folding portion and a non-folding portion, and the folding portion includes an inside surface that is compressed when folded and an outside surface that is stretched when folded, the folding portion includes a first layer adjacent to the outside surface, a second layer adjacent to the inside surface, and a third layer between the first layer and the second layer, the folding portion and the non-folding portion include at least one metal ion, a concentration of the metal ion included in the second layer is higher than a concentration of the metal ion included in the first layer, and the first layer includes a plurality of depletion regions.

11 Claims, 10 Drawing Sheets

COVER WINDOW, MANUFACTURING METHOD OF COVER WINDOW, AND DISPLAY DEVICE INCLUDING COVER WINDOW

CROSS-REFERENCE TO RELATED APPLICATION

This application claims priority to and the benefit of Korean Patent Application No. 10-2021-0044832, filed on Apr. 6, 2021 in the Korean Intellectual Property Office, the entire content of which is incorporated herein by reference.

BACKGROUND

1. Field

Aspects of embodiments of the present disclosure relate to a cover window, a manufacturing method of a cover window, and a display device including a cover window.

2. Description of the Related Art

Display devices, such as an organic light emitting display and a liquid crystal display, include a display panel manufactured by forming several layers and elements on a substrate. Recently, a flexible display panel and a flexible display device including the same have been developed.

The flexible display device may be classified into a bendable display device, a foldable display device, and a rollable display device depending on a use or a shape. Among these, the foldable display device may unfold and fold out a display panel displaying an image as if it were a book cover.

The foldable display device has a merit in that it may be folded to be compactly portable and may be unfolded to perform a wide screen function when being used.

The cover window used in the foldable display device includes a thin-thickness glass to be folded, and when an impact, such as an external object, such as a pen, falling on the thin cover window, is applied, a risk of damage or destruction of the cover window may increase.

SUMMARY

According to an aspect of one or more embodiments of the present disclosure elongation of a cover window is improved while impact strength is increased by increasing a degree of a freedom in the thickness of the cover window used in a foldable display device.

According to an embodiment of the present disclosure, a cover window includes a folding portion and a non-folding portion, wherein the folding portion includes an inside surface that is compressed when folded and an outside surface that is stretched when folded, the folding portion includes a first layer adjacent to the outside surface, a second layer adjacent to the inside surface, and a third layer between the first layer and the second layer, the folding portion and the non-folding portion include at least one metal ion, a concentration of the metal ion included in the second layer is higher than a concentration of the metal ion included in the first layer, and the first layer includes a plurality of depletion regions.

The second layer may not include depletion regions, or may include depletion regions at a lower concentration than that of the depletion regions included in the first layer.

The concentration of the metal ion included in the second layer may be higher than or the same as the concentration of the metal ion included in the third layer.

The concentration of the metal ion included in the non-folding portion may be the same as the concentration of the metal ion included in the third layer.

The metal ion may include at least one of a sodium ion (N+) and a potassium ion (K+).

The modulus of the first layer may be lower than the modulus of the second layer.

The modulus of the first layer may be lower than that of the third layer of the non-folding portion by 3% to 20%.

The first layer may include a surface layer positioned adjacent to a surface thereof that is not adjacent to the third layer, and the surface layer may have Si—OH bonding.

A toughness of the first layer may be greater than a toughness of the second layer or the third layer.

At least one thickness of the first layer and the second layer may be 1 micrometer to 6 micrometers.

A display device according to an embodiment includes the cover window and a display panel in contact with the cover window.

A manufacturing method of a cover window according to an embodiment includes: raising an atmosphere temperature of a chamber in which an original plate of a cover window is positioned; positioning a cathode and an anode respectively to oppose opposite surfaces of the cover window corresponding to a partial region of the original plate, and first applying a voltage; and forming the cover window comprising a folding portion corresponding to the partial region and a non-folding portion by lowering the atmosphere temperature of the chamber, in a state that the voltage is applied, after an amount of time after first applying the voltage.

The folding portion may include an inside surface that is compressed when folded and an outside surface that is stretched when folded, the folding portion may include a first layer adjacent to the outside surface, a second layer adjacent to the inside surface, and a third layer between the first layer and the second layer, the folding portion and the non-folding portion may include at least one metal ion, a concentration of the metal ion included in the second layer may be higher than a concentration of the metal ion included in the first layer, and the first layer may include a plurality of depletion regions.

The plurality of depletion regions may be generated in the forming of the cover window.

The second layer may not include depletion regions, or may include depletion regions at a lower concentration than a concentration of the depletion regions included in the first layer.

In the forming of the cover window, the metal ions may move from the first layer toward the second layer.

A potential difference applied between the cathode and the anode may be 500 V to 2000 V.

The amount of time may be 10 minutes to 30 minutes.

The method may further include inserting a reaction gas including hydrogen (H) in the chamber.

According to an aspect of one or more embodiments, a degree of freedom of the thickness of the cover window used in the foldable display device may be increased to increase impact strength while improving elongation of the cover window.

DESCRIPTION OF SYMBOLS

Figure 1:
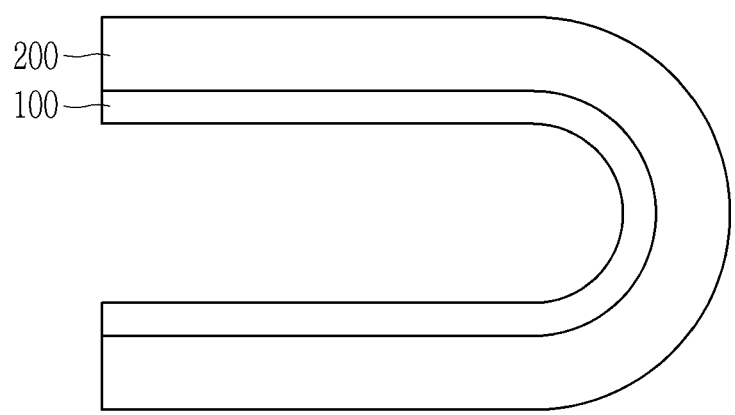
FIG. 1 is a side view of a display device in a folded state according to an embodiment.

| | |
|---|---|
| 31: cathode | 32: anode |
| 100: cover window | 110: first layer |
| 111: surface layer | 120: second layer |
| 130: third layer | 200: display panel |
| A: non-folding portion | B: folding portion |
| DPR1, DPR2: depletion region | IA, IB: ion |

DETAILED DESCRIPTION

The present invention will be described more fully herein with reference to the accompanying drawings, in which some example embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, sizes and thicknesses of constituent members shown in the accompanying drawings may be arbitrarily given for better understanding and ease of description, and the present invention is not limited to the illustrated sizes and thicknesses. In the drawings, the thickness of layers, films, panels, regions, etc., may be exaggerated for clarity. In the drawings, for better understanding and ease of description, the thicknesses of some layers and areas may be exaggerated.

It is to be understood that when an element such as a layer, film, region, or substrate is referred to as being "on" another element, it may be directly on the other element or one or more intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise," and variations such as "comprises" or "comprising," will be understood to imply the inclusion of stated elements but not the exclusion of any other elements.

Further, in the specification, the phrase "on a flat surface" means when an object portion is viewed from above, and the phrase "on a cross-section" means when a cross-section taken by vertically cutting an object portion is viewed from the side.

Unless otherwise defined, all terms including technical and scientific terms used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

A cover window according to an embodiment and a display device including the same are described below with reference to the accompanying drawings.

Figure 2:
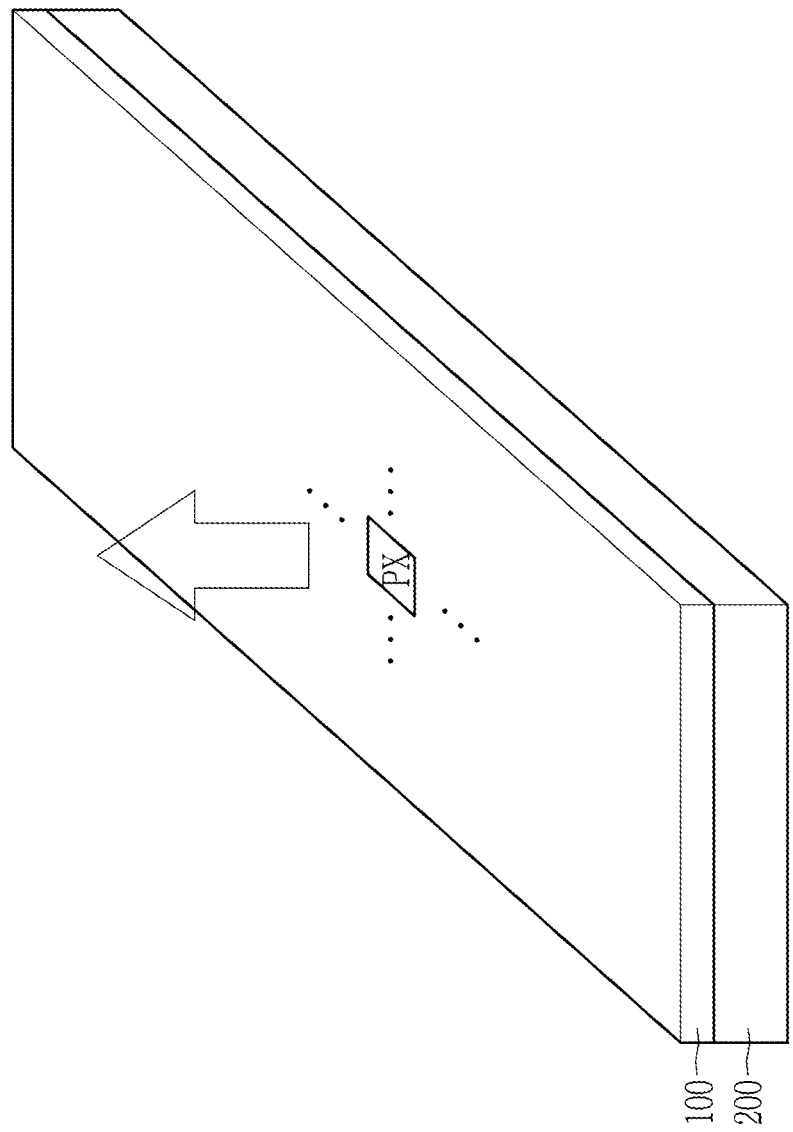
FIG. 2 is a schematic perspective view of a display device in an unfolded state according to an embodiment.
Figure 3:
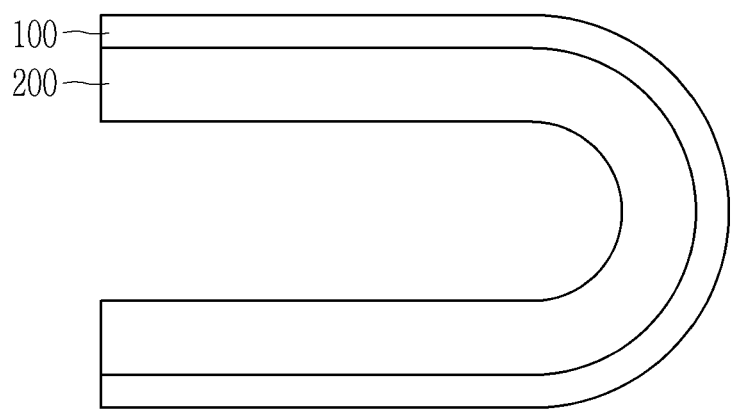
FIG. 3 is a side view of a display device in a folded state according to an embodiment.

FIG. 1 is a side view of a display device in a folded state according to an embodiment, FIG. 2 is a schematic perspective view of a display device in an unfolded state according to an embodiment, and FIG. 3 is a side view of a display device in a folded state according to an embodiment.

Referring to FIG. 1, a display device according to an embodiment may be a foldable display device. As shown in FIG. 1, the display device according to an embodiment may include a display panel 200 and a cover window 100 disposed on a surface of the display panel 200.

Referring to FIG. 2, the display panel 200 may include a plurality of pixels PX capable of displaying an image. The display panel 200 may be a light-emitting display panel of which the pixel PX includes a light-emitting element or a liquid crystal panel of which the pixel PX includes a liquid crystal capacitor.

Among the surfaces of the display panel 200, a surface on which the cover window 100 is positioned may be a display surface on which an image is displayed. The arrow direction shown in FIG. 2 is an image display direction.

Referring to FIG. 1, the display device according to an embodiment may be folded in a direction in which the cover window 100 faces itself. That is, the display surface may not be exposed when the display device is folded, and the display surface may be exposed when the display device is unfolded.

Referring to FIG. 3, the display device according to another embodiment may be folded in a direction in which the display panel 200 faces itself. That is, the display surface may be exposed outside when the display device is folded, and the display surface may be exposed even when the display device is unfolded.

Figure 4:
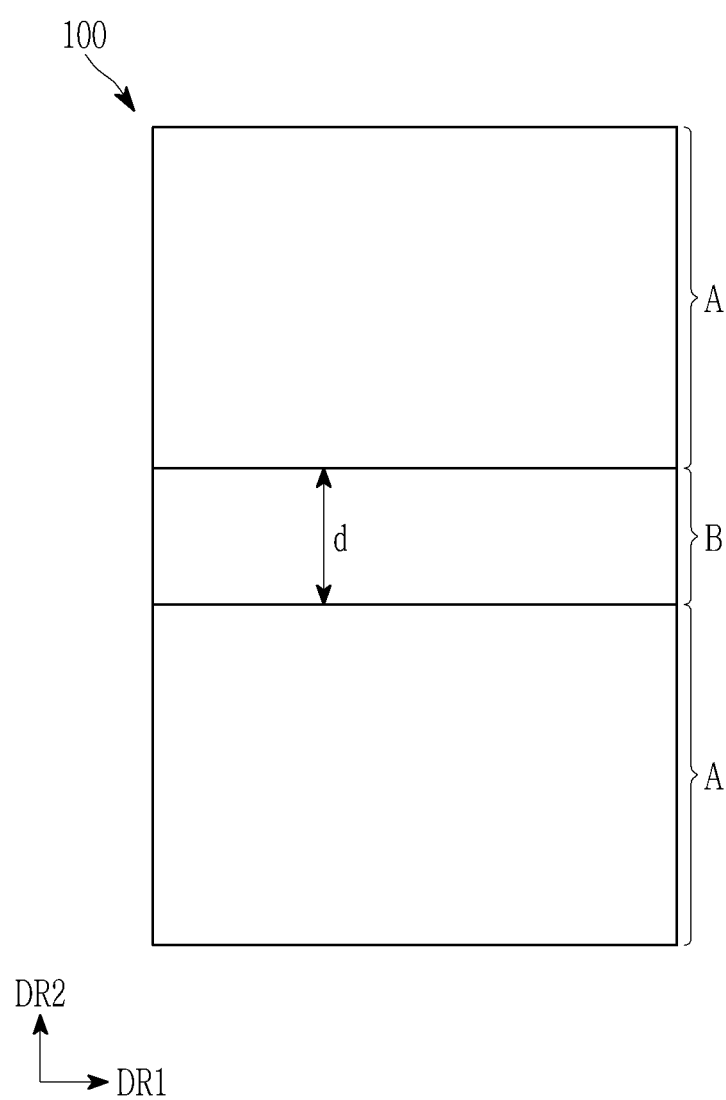
FIG. 4 is a top plan view showing a cover window of a display device according to an embodiment, showing a structure when not folded.
Figure 5:
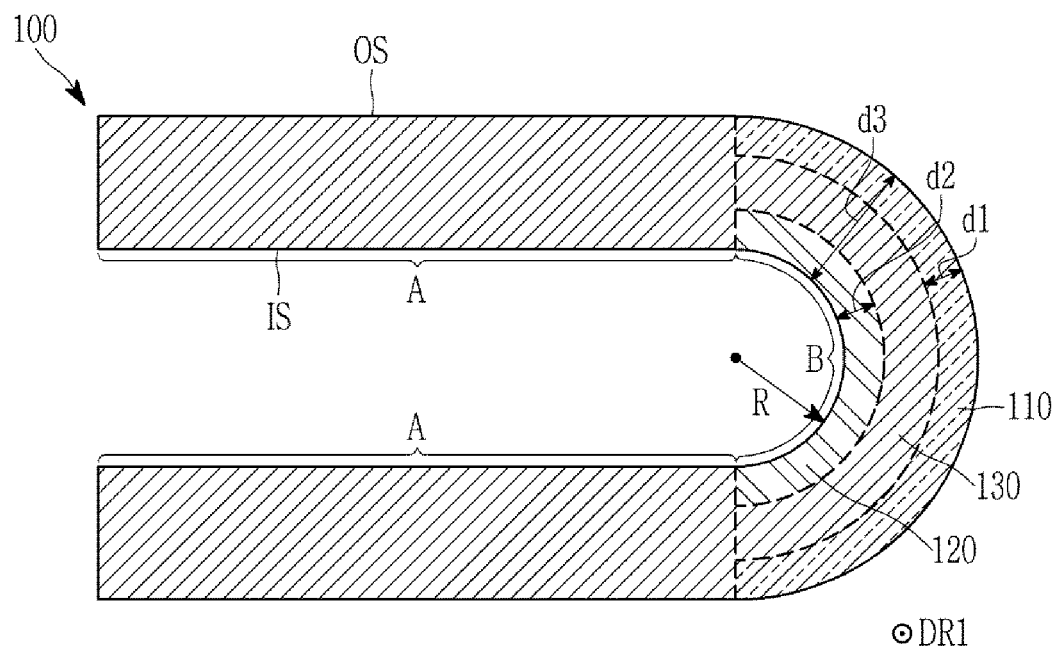
FIG. 5 is a side view showing a cover window of a display device according to an embodiment, showing a structure when folded.

FIG. 4 is a top plan view showing a cover window 100 of a display device according to an embodiment, showing a structure when not folded; and FIG. 5 is a side view showing the cover window 100 of a display device according to an embodiment, showing a structure when folded about a first direction DR1.

Referring to FIG. 4, the cover window 100 according to an embodiment includes a folding portion B that bends when being folded and a non-folding portion A that does not bend when being folded. The cover window 100 may be folded along a second direction DR2 perpendicular to the first direction DR1.

Referring to FIG. 4 and FIG. 5, when a curvature radius in a folded state of the cover window 100 is R, a length d of the folding portion B may be $\pi R$.

In an embodiment, the curvature radius R may be approximately 1 mm to approximately 2 mm, but is not limited thereto.

Since the non-folding portion A is a non-bent portion, it may also be referred to as a flat portion.

In FIG. 5, when the cover window 100 is folded, the surfaces that are positioned inside and face each other are defined as an inside surface IS, and the portion positioned on the outside is defined as an outside surface OS. That is, the surface to be compressed during the folding is the inside surface IS of the cover window 100, and the surface to be stretched is the outside surface OS of the cover window 100.

In the case of the embodiment shown in FIG. 1 described above, when the cover window 100 is combined with the display panel 200, an image is displayed through the inside surface IS of the cover window 100 and may be in contact with the display panel 200 on the outside surface OS. That is, the inside surface IS of the cover window 100 may be a display surface, and the outside surface OS may be a non-display surface.

In the case of the embodiment shown in FIG. 3 described above, when the cover window 100 is combined with the display panel 200, the image is displayed through the outside surface OS of the cover window 100 and may be in contact with the display panel 200 on the inside surface IS. That is, the outside surface OS of the cover window 100 may be a display surface, and the inside surface IS may be a non-display surface.

The cover window 100 according to an embodiment includes glass. In an embodiment, the glass included in the cover window 100 may be a silicate type of glass. In addition, the cover window 100 may include ions of alkali or alkaline earth metals, for example, ions such as Na, K, Li, Mg, Ca, Sr, Ba, or Al. The ions of alkali or alkaline earth metals may generate non-bridging oxygen (NBO).

The folding portion B of the cover window 100 has a different characteristic from that of the non-folding portion A, which is not subjected to such processing due to processing in the manufacturing process of the cover window 100. This treatment may be a thermal poling treatment. The configuration of the folding portion B is described with reference to FIG. 6 along with FIG. 5.

Figure 6:
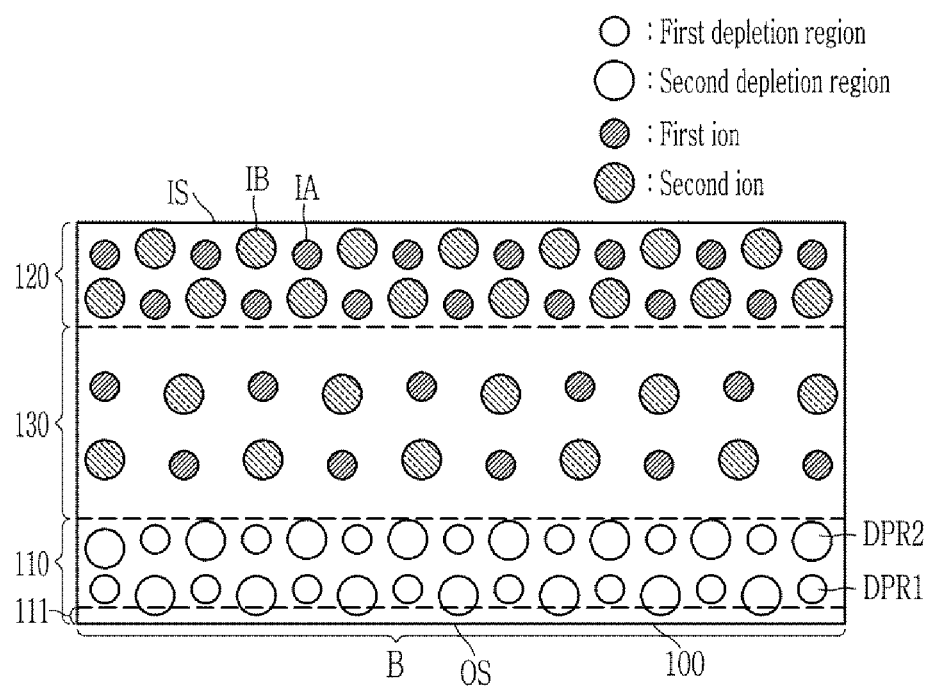
FIG. 6 is a view showing a plurality of layers divided according to characteristics of a cross-section of a folding portion of a cover window according to an embodiment.

FIG. 6 is a view showing a plurality of layers divided according to characteristics of a cross-section of a folding portion of the cover window 100 according to an embodiment.

Referring to FIG. 5 and FIG. 6, the folding portion B includes a first layer 110 and a second layer 120 with different characteristics. A third layer 130 may be positioned between the first layer 110 and the second layer 120.

The first layer 110 forms an ion depletion layer including a plurality of pores or depletion regions DPR1 and DPR2 through which ions of alkali or alkaline earth metals generating NBO have escaped. The depletion regions DPR1 and DPR2 may be sites or holes where at least one ion of alkali or alkaline earth metals has escaped. In the following description, when referred to as an ion, it means the ion of the alkali or alkaline earth metals included in the cover window 100.

FIG. 6 shows the depletion regions DPR1 and DPR2 due to ions of two kinds as an example. The first depletion region DPR1 may be a site from which a first ion IA, for example a sodium ion (Na+), has escaped, and the second depletion region DPR2 may be a site from which a second ion IB, for example, a potassium ion (K+), has escaped.

Sodium ions (Na+) and potassium ions (K+) may not remain in the first layer 110 but some may remain.

In an embodiment, a thickness d1 of the first layer 110 may be about 1 micrometer to about 6 micrometers, but is not limited thereto.

The second layer 120 has a higher concentration of at least one kind of the ion compared to the first layer 110. Here, a concentration may mean the number of ions per unit volume. According to an embodiment, as shown in FIG. 6, the second layer 120 may have a higher concentration of at least two kinds of ions, that is, the first ion IA and the second ion IB, compared to the first layer 110. The first ion IA may be, for example, a sodium ion (Na+), and the second ion IB may be, for example, a potassium ion (K+).

The third layer 130 also has a higher concentration of at least one kind of the ion compared to the first layer 110. According to an embodiment, the third layer 130 may have a higher concentration of at least two kinds of ions, that is, the first ion IA and the second ion IB, compared to the first layer 110. The first ion IA may be, for example, a sodium ion (Na+), and the second ion IB may be, for example, a potassium ion (K+).

The concentration of the first ion IA of the second layer 120 may be higher or similar to that of the first ion IA of the third layer 130. Similarly, the concentration of the second ion IB of the second layer 120 may be higher or similar to that of the second ion IB of the third layer 130. FIG. 6 shows a case in which the concentration of the first ion IA and the second ion IB of the second layer 120 is higher than the concentration of the first ion IA and the second ion IB of the third layer 130 as an example.

The depletion regions DPR1 and DPR2 may not be present in the third layer 130, but some depletion regions DPR1 and DPR2 may be positioned in a portion of a region thereof adjacent to the first layer 110. Although the third layer 130 may include the depletion regions, the concentration of the depletion regions DPR1 and DPR2 thereof is lower than that of the first layer 110.

In the second layer 120, the depletion regions DPR1 and DPR2 may not be present. However, even if the second layer 120 includes the depletion regions, the concentration thereof is lower than the concentrations of the depletion regions DPR1 and DPR2 of the first layer 110.

In an embodiment, a thickness d2 of the second layer 120 may be about 1 micrometer to about 6 micrometers, but is not limited thereto.

In an embodiment, a thickness d3 of the cover window 100 may be greater than about 30 micrometers.

In an embodiment, a composition and concentration of the ion and depletion regions of the non-folding portion A of the cover window 100 may be the same or substantially the same as the third layer 130 of the folding portion B. In the present description, the meaning that a certain characteristic is the same or substantially the same may mean a case in which the difference is less than 2%.

The first layer 110 is the layer closest to the outer surface OS of the cover window 100, and is the layer that receives the greatest tensile stress due to the greatest amount of the deformation when the cover window 100 is folded. According to the present embodiment, the first layer 110 including a plurality of depletion regions DPR1 and DPR2 forms a loose structure by the depletion regions DPR1 and DPR2 such that a modulus, more specifically, a tensile modulus, is lower than in the second layer 120 and the third layer 130. Therefore, stretchability of the folding portion B of the cover window 100 may be significantly improved.

Accordingly, it is not necessary to reduce the thickness d3 of the cover window 100 for ease of folding, and, thus, the degree of freedom of the thickness of the cover window 100 may be increased. That is, since the thickness d3 of the cover window 100 may be increased without lowering the stretchability of the cover window 100, the impact strength of the cover window 100 may be improved.

In addition, there is no need to process or pattern the shape of the cover window as in the prior art to facilitate the folding of the folding portion B. Therefore, it is possible to prevent or substantially prevent visual recognition of the portion of the display panel 200 corresponding to the folding portion B.

In an embodiment, the modulus of the first layer 110 may be, for example, about 3% to about 20% lower than that of the third layer 130 or the non-folding portion A.

In an embodiment, the modulus of the second layer 120 may be higher or similar to that of the third layer 130.

The hardness of the first layer 110 may be lower than that of the second layer 120 and the third layer 130 due to the influence of a plurality of depletion regions DPR1 and DPR2. In an embodiment, the hardness of the second layer 120 may be higher or comparable to that of the third layer 130.

Referring to FIG. 6, the first layer 110 may further include a surface layer 111 positioned adjacent to a surface of the first layer 110 that is not adjacent to the third layer 130. In an embodiment, the surface layer 111 may have different bonding of components from remaining regions of the first layer 110. This may vary depending on the reaction gas used in the manufacturing process of the cover window 100, and, for example, Si—O bonding of the first layer 110 may react with a reaction gas including hydrogen (H), thereby forming the surface layer 111. For example, the surface layer 111 may include more Si—OH bonding than the remaining regions of the first layer 110.

By the surface layer 111 including the Si—OH bonding, the toughness of the first layer 110 may be greater than that of the second layer 120 or the third layer 130.

In an embodiment, the surface layer 111 may occupy only a part of the surface of the first layer 110 or may occupy a substantial majority of the first layer 110.

Next, a manufacturing method of a cover window according to an embodiment is described.

Figure 7:
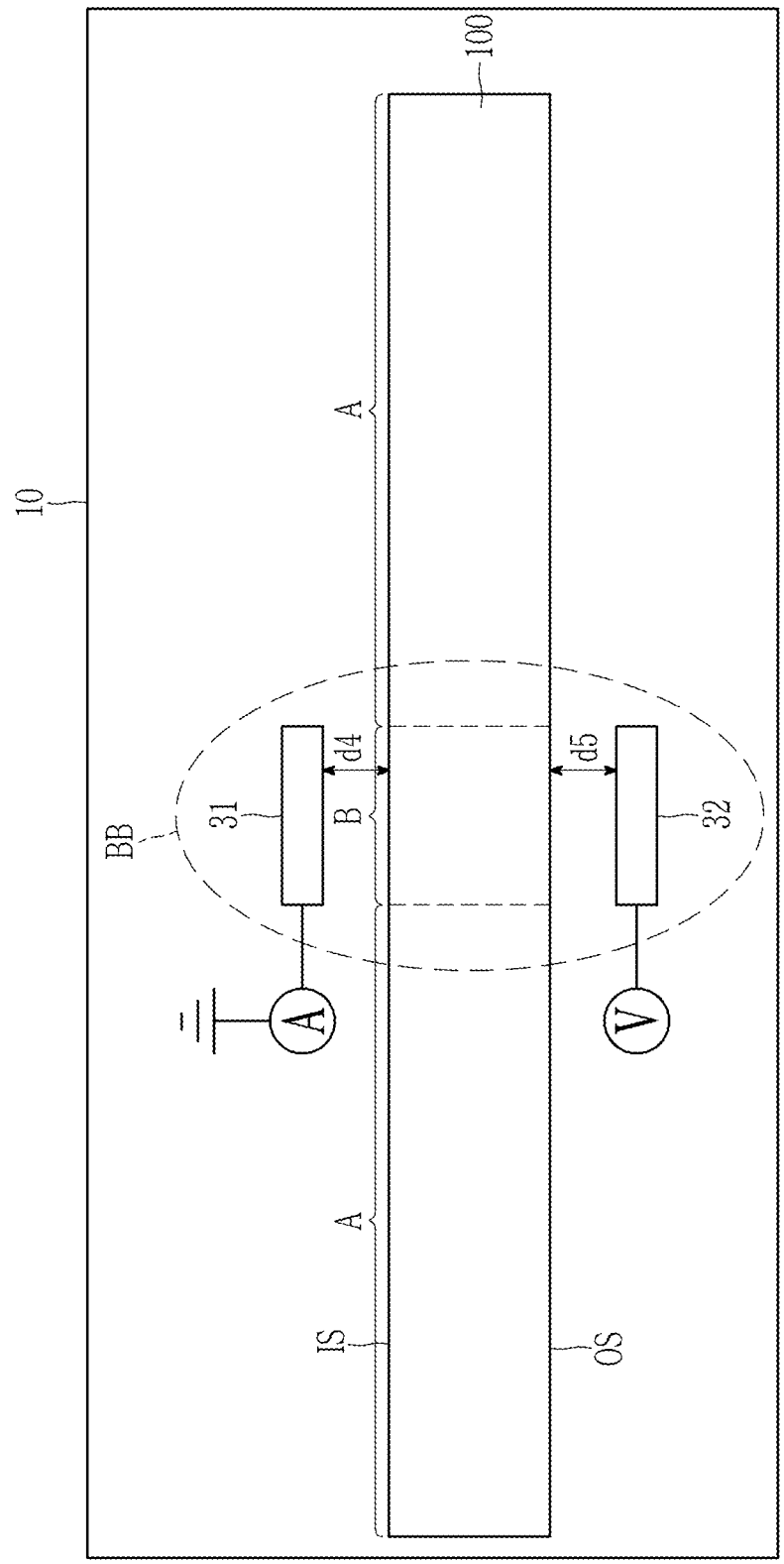
FIG. 7 is a view showing a manufacturing method of a cover window according to an embodiment.
Figure 8:
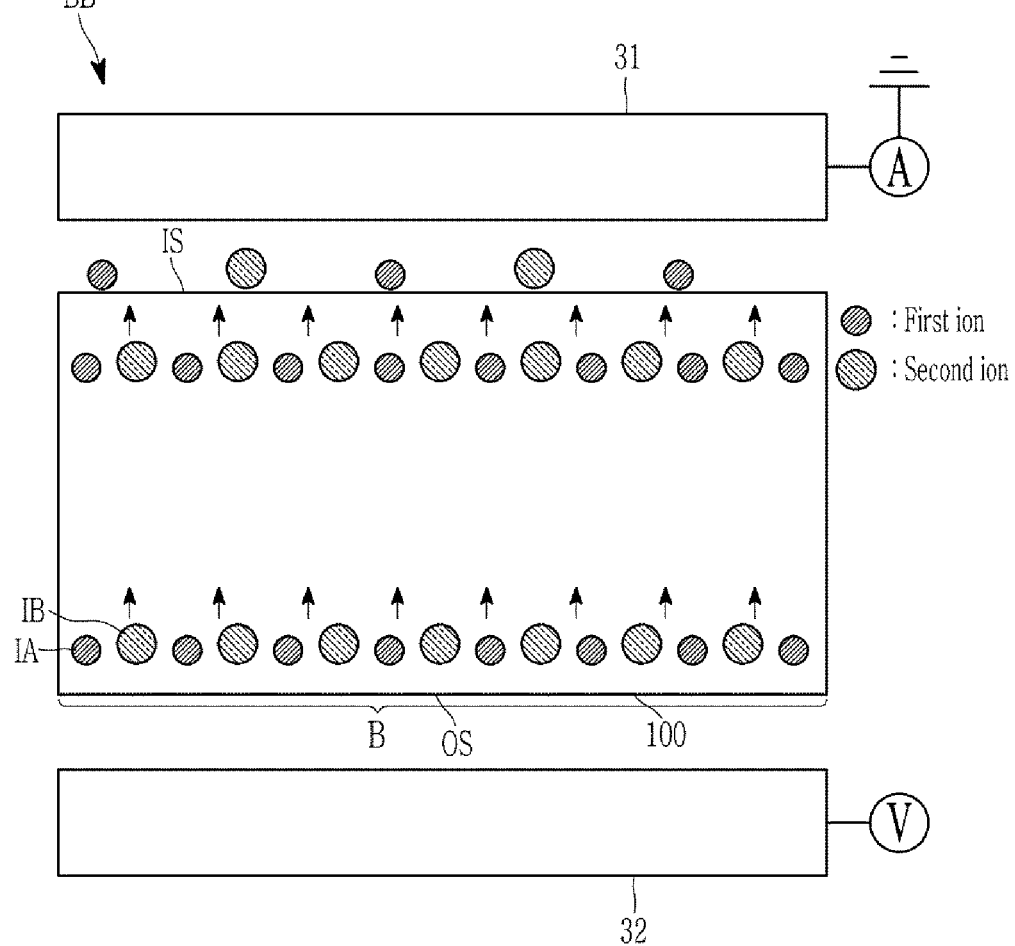
FIG. 8 is an enlarged view of a region "BB" shown in FIG. 7 conceptually showing a movement of ions occurring inside a folding portion of a cover window.
Figure 9:
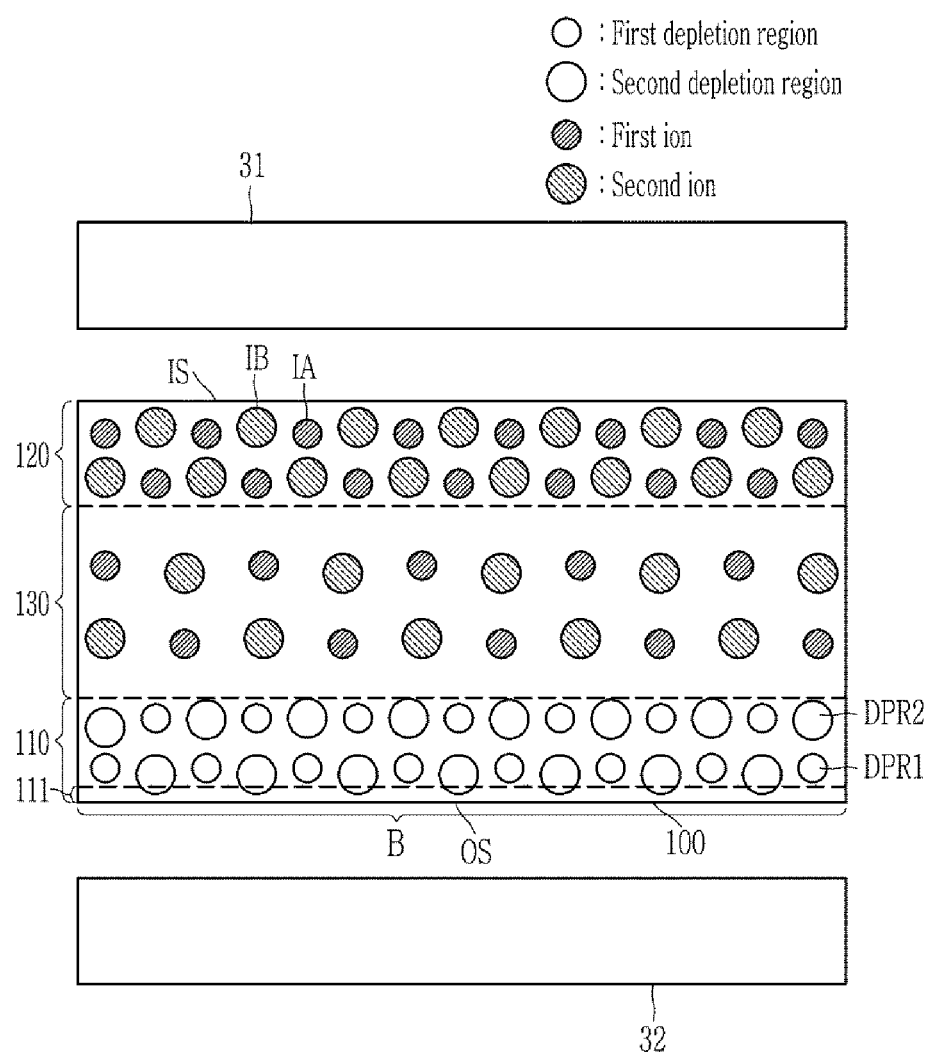
FIG. 9 is a view showing a plurality of layers of different characteristics included in a cover window after a process of a manufacturing method shown in FIG. 7.
Figure 10:
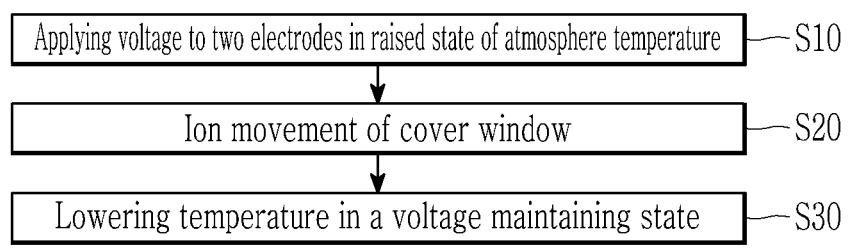
FIG. 10 is a flowchart of a manufacturing method of a cover window according to an embodiment.

FIG. 7 is a view showing a manufacturing method of a cover window according to an embodiment; and FIG. 8 is an enlarged view of a region "BB" shown in FIG. 7 conceptually showing a movement of ions occurring inside a folding portion of a cover window. FIG. 9 is a view showing a plurality of layers of different characteristics included in a cover window after a process of a manufacturing method shown in FIG. 7; and FIG. 10 is a flowchart of a manufacturing method of a cover window according to an embodiment.

A manufacturing process of a cover window according to the present embodiment is a thermal poling process limited to a part of the cover window, that is, the folding portion B.

First, referring to FIG. 7, atmosphere temperature of a chamber 10, in which an original plate of the cover window 100 before the process is positioned, is increased to about 200° C. to about 300° C. At this time, the atmosphere temperature is set to a lower temperature than a temperature at which the deformation of the glass begins, that is, a strain point (about 500° C. to about 600° C.).

In the state that the atmosphere temperature is raised, a cathode 31 and an anode 32 are respectively positioned on the surfaces of both sides limited to a partial region corresponding to the folding portion B of the original plate of the cover window, and a potential difference is generated by applying a voltage. At this time, the cathode 31 is positioned on the inside surface IS side of cover window 100, and the anode 32 is positioned on the outside surface OS side of the cover window 100. An interval d4 between the cathode 31 and the cover window 100 is greater than 0 mm, and may be, for example, approximately 1 mm. Likewise, an interval d5 between the anode 32 and the cover window 100 is greater than 0 mm, and may be, for example, approximately 1 mm.

The potential difference between the cathode 31 and the anode 32 may be, for example, approximately 500 V to approximately 2000 V. A time for applying the voltage between the cathode 31 and the anode 32 in the state that the atmosphere temperature is raised may be, for example, about 10 minutes to about 30 minutes.

Referring to FIG. 8, the movement of the ions IA, IB occurs inside the cover window 100, which is positioned between the cathode 31 and the anode 32. Particularly, the ions IA, IB of alkali or alkaline earth metals such as Na+ and K+, which produce a non-bridging oxygen (NBO), move from the anode 32 side to the cathode 31 side. Some of the ions IA, IB that have migrated toward the inside surface IS side of the cover window 100 may escape to the outside air or remain on the surface of the inside surface IS. As described above, because the interval d4 between the cathode 31 and the cover window 100 is larger than 0 mm, the ions IA, IB that have moved toward the inside surface IS may easily escape into the air.

Resultantly, as shown in FIG. 9, the concentration of the ions IA, IB in a certain portion of the inside surface IS side of the cover window 100 is higher, such that the second layer 120 having the concentration that is higher than or substantially the same as that of the ions IA, IB of the third layer 130, which is an intermediate layer, is formed. In addition, a certain portion of the cover window 100 on the outside surface OS side forms a first layer 110, which is an ion depletion layer including the plurality of depletion regions DPR1 and DPR2.

In an embodiment, the surface layer 111 described above may be formed by changing the surface characteristic of the first layer 110 of the folding portion B by inserting a reaction gas into the chamber 10 in the state that the voltage is applied between the cathode 31 and the anode 32. That is, the Si—OH bonding of the surface layer 111 may be formed by injecting a gas that may react with the Si—O bonding inside the glass, for example, hydrogen gas or water vapor. Accordingly, it is possible to increase the toughness of the first layer 110.

On the other hand, depending on the kind and the concentration of the reaction gas, there may be a change in the degree of the reduction of the modulus of the first layer 110.

Next, the temperature of the chamber 10 is lowered while maintaining the potential difference between the cathode 31 and the anode 32. For example, the temperature may be lowered to approximately 50° C. Then, the moved ions IA, IB are fixed inside the cover window 100, and the changed characteristic of the cover window 100 may be fixed. That is, the first layer 110 and the second layer 120 of the folding portion B of the cover window 100 may be formed.

While the modulus of the first layer 110 formed by the thermal poling process is considerably lower than before the process, the modulus of the second layer 120 may be maintained or slightly increased. In addition, the hardness of the first layer 110 may be lower than before the process due to the influence of a plurality of depletion regions DPR1 and DPR2, while the hardness of the second layer 120 may be increased.

The sequence of these thermal poling processes is summarized as shown in FIG. 10. First, a voltage between the anode and the cathode is applied while raising the atmosphere temperature in the chamber (S10). Then, the ions in the cover window move toward the cathode (S20). Subsequently, while maintaining the voltage applied to the anode and the cathode, the temperature of the chamber is lowered to fix the ion position (S30).

While the present invention has been described in connection with what are presently considered to be some practical embodiments, it is to be understood that the invention is not limited to the disclosed embodiments. On the contrary, it is intended to cover various modifications and equivalent arrangements included within the spirit and scope of the appended claims.

What is claimed is:

1. A cover window comprising a folding portion and a non-folding portion,
    wherein the folding portion comprises an inside surface that is compressed when folding and an outside surface that is stretched when folding,
    the folding portion comprises a first layer adjacent to the outside surface, a second layer adjacent to the inside surface, and a third layer between the first layer and the second layer,
    the folding portion and the non-folding portion comprise at least one metal ion,
    a concentration of the metal ion included in the second layer is higher than a concentration of the metal ion included in the first layer, and
    the first layer comprises a plurality of depletion regions.

2. The cover window of claim 1, wherein the second layer does not comprise depletion regions, or comprises depletion regions at a lower concentration than a concentration of the depletion regions included in the first layer.

3. The cover window of claim 2, wherein the concentration of the metal ion included in the second layer is higher than or the same as a concentration of the metal ion included in the third layer.

4. The cover window of claim 1, wherein a concentration of the metal ion included in the non-folding portion is the same as a concentration of the metal ion included in the third layer.

5. The cover window of claim 1, wherein the metal ion comprises at least one of a sodium ion (N+) and a potassium ion (K+).

6. The cover window of claim 1, wherein a modulus of the first layer is lower than a modulus of the second layer.

7. The cover window of claim 6, wherein the modulus of the first layer is lower than a modulus of the third layer of the non-folding portion by 3% to 20%.

8. The cover window of claim 1, wherein
    the first layer comprises a surface layer adjacent to a surface thereof that is not adjacent to the third layer, and
    the surface layer comprises Si—OH bonding.

9. The cover window of claim 8, wherein a toughness of the first layer is greater than a toughness of the second layer or the third layer.

10. The cover window of claim 1, wherein a thickness of at least one of the first layer or the second layer is 1 micrometer to 6 micrometers.

11. A display device comprising:
    the cover window of claim 1; and
    a display panel in contact with the cover window.

* * * * *